US009591140B1

(12) United States Patent
Carlson et al.

(10) Patent No.: US 9,591,140 B1
(45) Date of Patent: Mar. 7, 2017

(54) AUTOMATIC CONFERENCE CALL CONNECTION

(71) Applicant: AMAZON TECHNOLOGIES, INC., Reno, NV (US)

(72) Inventors: Matthew Rice Carlson, Seattle, WA (US); David Daniel Glick, Seattle, WA (US); Udit Madan, Seattle, WA (US); Michael Ellsworth Bundy, Seattle, WA (US); Robert Dreaper McDonald, Jr., Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/228,063

(22) Filed: Mar. 27, 2014

(51) Int. Cl.
*H04M 3/42* (2006.01)
*G06F 3/00* (2006.01)
*G06F 15/16* (2006.01)
*H04M 3/56* (2006.01)

(52) U.S. Cl.
CPC .................................... *H04M 3/56* (2013.01)

(58) Field of Classification Search
CPC ..... H04M 2242/15; H04M 2203/2094; H04M 2203/25; H04M 2203/50; H04M 3/56; H04M 3/387
USPC ............ 379/202.01, 265.13, 207.12, 207.13, 379/201.1, 201.01, 201.06; 715/753; 709/204; 340/572.1; 455/416
See application file for complete search history.

(56) References Cited

U.S. PATENT DOCUMENTS

| 7,499,535 | B1 * | 3/2009 | Ivory et al. .............. 379/202.01 |
| 8,824,662 | B2 * | 9/2014 | Martin ..................... 379/265.13 |
| 2007/0008130 | A1 * | 1/2007 | Ashwood Smith ........ 340/572.1 |
| 2010/0169418 | A1 * | 7/2010 | Whynot et al. ............... 709/204 |
| 2011/0167357 | A1 * | 7/2011 | Benjamin et al. ............ 715/753 |

* cited by examiner

*Primary Examiner* — Thjuan K Addy
(74) *Attorney, Agent, or Firm* — Lowenstein Sandler LLP (57) ABSTRACT

A conferencing system receives information identifying a user and retrieves calendar information specifying scheduled events of the user. The conferencing system selects one of the events and joins the user to the event without the user manually entering information about the event.

20 Claims, 7 Drawing Sheets

AUTOMATIC CONFERENCE CALL CONNECTION

BACKGROUND

In order to join a conference call, a user may dial the telephone number of a conference call system and, once connected to and prompted by the conference call system, input a conference call identification number. In some cases, a user may input a conference call password or other information. This information may not be readily available to the user, particularly when joining the conference call from a shared location, such as a conference room.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only. Further, it should be understood that the drawings are not necessarily proportional or to scale.

DETAILED DESCRIPTION

A conferencing system in accordance with the embodiments described below may be used to join a user to a scheduled conference call without the user manually entering conference call information. The conferencing system receives user identification information indicative of the identity of the user, retrieves information usable to connect the user to a conference call the user is scheduled to join, and joins the user to the call.

The conferencing system may include (or be connected to) a database that includes entries associating user identification information and conference call information. Each entry may correspond to a conference call the user is scheduled to join. Based on the user identification information, the conferencing system determines related conference call information and uses it to automatically join the user to the conference call.

Thus, the user in a conference room may join a scheduled conference call without memorizing the conference call information or printing it out and bringing the printout to the conference room. Rather, the user can join the conference call by simply providing the user identification information, which may be embedded in a badge (e.g., an identification badge) or more easily remembered by the user. Even if the conference call information is readily available, the conferencing system may save time by automatically joining the user to the conference call without the user spending additional time manually inputting the information.

Although embodiments described below refer generally to joining a user to a conference call, it is to be appreciated that other aspects described herein may be used in other environments or for joining users to other events. For example, aspects described herein may be used to join a user to a chat session, a webinar, or an online meeting. As another example, aspects described herein may be used to connect a worker with a scheduled task.

Figure 1:
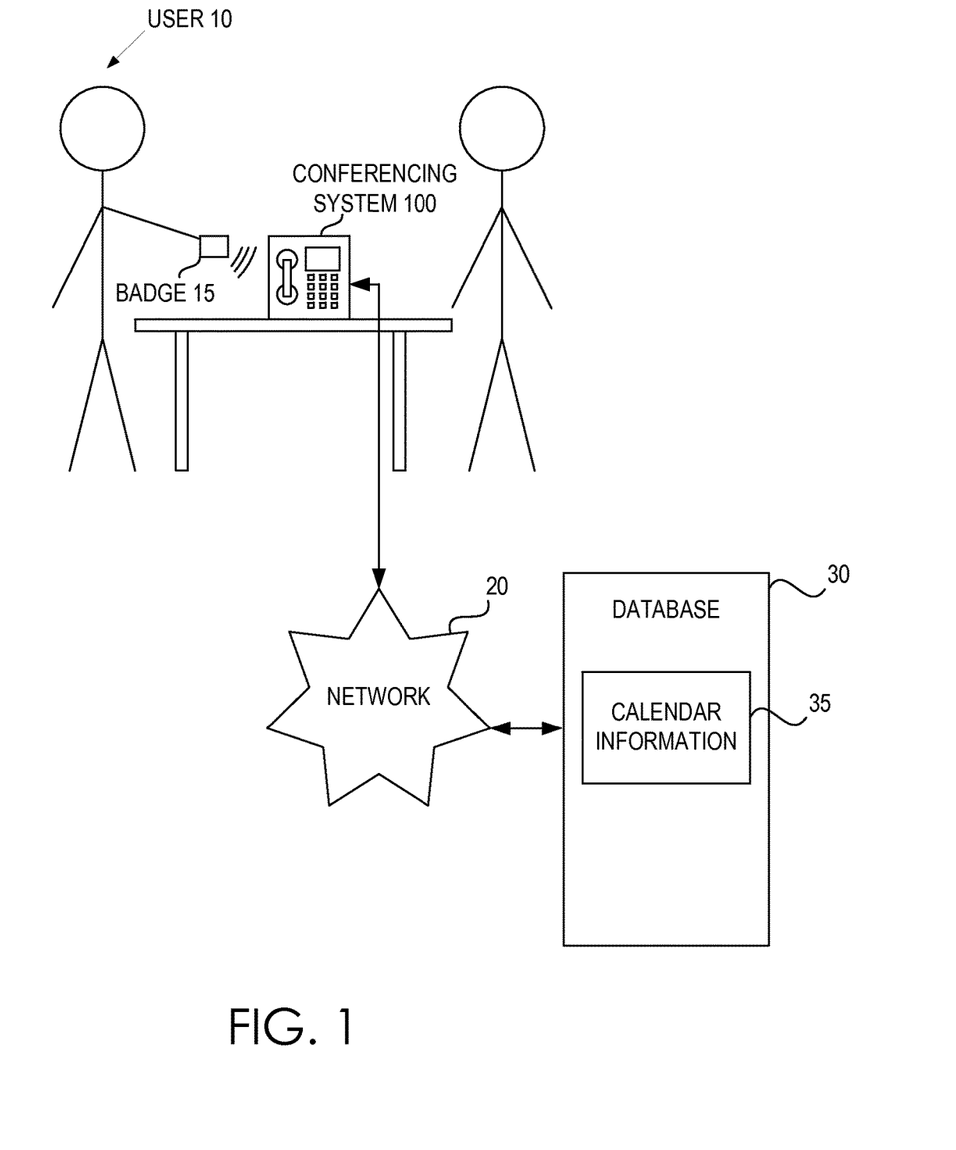
FIG. 1 illustrates usage of a conferencing system according to one embodiment.

FIG. 1 illustrates usage of a conferencing system 100 according to one embodiment. A user 10 wishing to join a conference call positions a badge 15 proximal to a reader of the conferencing system 100. As described in more technical detail below, the conferencing system 100 reads user identification information from the badge 15, retrieves information concerning a conference call that the identified user is scheduled to join, and automatically (without further user input) joins the identified user to conference call.

The conferencing system 100 may read the user identification information from the badge 15 by reading an RFID (radio frequency identification) chip embedded within the badge 15. The RFID chip may encode user identification information in the form of an employee identification number, a username, or other user identifier. Alternatively, the conferencing system may read a barcode, receive a user PIN (person identification number), receive biometric information from the user, or receive other information that identifies and/or authenticates the user.

The conferencing system 100 may retrieve information concerning a conference call that the identified user is scheduled to join by querying a database 30 over a network 20. The database may include calendar information 35 concerning a number of users. The calendar information 35 may include a number of records, each record associated with a user identifier and each record including a set of entries. Each entry may include details concerning a conference call or other event the user is scheduled to join.

The conferencing system 100 may use the details in the entry to join the user to the conference call. For example, the conferencing system 100 may automatically dial a conference call telephone number, enter a conference call identification call, enter a conference call password, and/or provide other information (based on the details in the entry) to join the user to the conference call. The conferencing system 100 may connect the user to the conference call over the network 20 or over a different network (e.g., over a public switched telephone network (PSTN).

Figure 2:
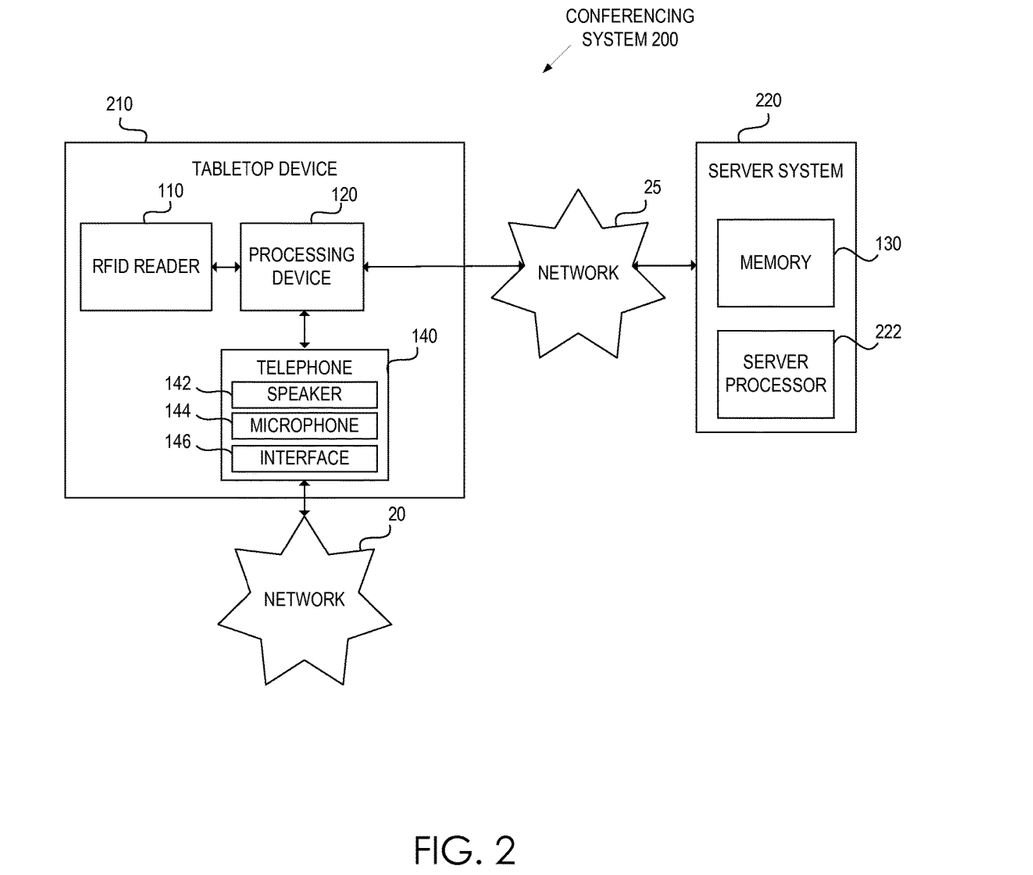
FIG. 2 illustrates a block diagram of a conferencing system, in accordance with one embodiment.

FIG. 2 illustrates a block diagram of a conferencing system 200, in accordance with one embodiment. The conferencing system 200 includes a tabletop device 210 with an RFID (radio frequency identification) reader 110 coupled to a processing device 120. The tabletop device 210 may be, e.g., a conference phone, a mobile phone, a mobile computer, a tablet computer or other device. In one embodiment, the tabletop device 210 includes an RFID reader 110, a processing device 120 and a telephone 140 (including, e.g., a speaker 142, a microphone 144 and an interface 146). Alternatively, the RFID reader 110 or another reader may be a peripheral device that is connected to the tabletop device 210 (e.g., via a universal serial bus (USB) connection, a Lightning connection, a FireWire connection, a Thunderbolt™ connection, a Bluetooth® connection, a Zigbee® connection, or other wired or wireless connection).

The RFID reader 110 receives user identification information from an RFID chip embedded in a badge of a user (e.g., badge 15 of FIG. 1). The user identification information may include a name, an employee number or any other data identifying the user to whom the badge belongs. The processing device 120 receives the user identification information from the RFID reader 110. In other conferencing systems, such as the conferencing system 300 of FIG. 3 described below, other input devices may be used. The processing device 120 communicates with the server system 220 to retrieve calendar information associated with one or more conference calls the user is scheduled to join.

In one embodiment, the processing device 120 prompts a user to provide a personal identification number (PIN) or other credential (issues a challenge) to authenticate the user. Responsive to receiving a PIN or other credential (challenge response), the processing device 120 may perform a user authentication or send an authentication message to the server system 220 requesting that the server system 220 perform the authentication. The authentication message may be sent to the server system 220 as part of a query to retrieve the calendar information or may be a separate message. In another embodiment, the authentication message may be sent to an authentication server prior to querying the server system 200 for calendar information.

As noted above, in one embodiment, the processing device 120 generates and transmits a query to a server system 220 that is remote from the tabletop device 210. The tabletop device 210 may be connected to a network 25, which may be a public network (e.g., the Internet), a private network (e.g., a wide area network (WAN), local area network (LAN), an intranet, etc.), or a combination thereof. The tabletop device 210 may send the query to the server system 220 over the network 25. The query may request that the server system 220 return calendar information associated with one or more conference calls the user is scheduled to join. The query may include the user identification information. Other information that may be included in the query is a time stamp, a location from which the query originated, a type of system making the query (e.g. a conference phone, a mobile phone, a tablet computer, etc.), capabilities of the device that generated the query, and so forth.

The server system 220 may store, in a memory 130, calendar information for a number of users associated with different user identification information. The server system 220 may include one or more computing devices that include the memory 130 and one or more server processors 222 for performing the functionality of the server system described below. In response to receiving the query including the user identification information associated with a particular user, the server system 220 may retrieve from the memory 130 and return to the processing device 120 one or more calendar information entries associated with the particular user. The calendar information entries may specify a time the user is scheduled to join a conference call. The calendar information entries may also include additional information. Examples of such additional information include a conference call system telephone number, a conference call identification number, a conference call password, and other information.

If more than one calendar information entry associated with more than one conference call is retrieved, the processing device 120 may select one of the conference calls to which to join the user. The processing device 120 may select a conference call that is scheduled to begin at a time closest to the present time. The processing device 120 may alternatively or additionally select a conference call based on a priority of the conference call. For example, a conferencing call in which the user is designated as the leader of the conference call may be given a higher priority than other conference calls. The priority of the conference call may be indicated in the calendar information entry. Other criteria such as the number of people scheduled to join the conference call or the length of the conference call may also be used to select a conference call. In another embodiment, if a user is scheduled to join more than one conference call, the server system 220, using the server processor 222, may select one of the conference calls and return only a single calendar information entry associated with the selected conference call. The server system 220 may select the conference call based on timing, priority, and/or other criteria. If a single calendar information entry is retrieved, the processing device 120 may inherently select the single calendar information entry.

The tabletop device 210 includes a telephone 140 that connects the tabletop device 210 to a network 20. The network 20 may include a circuit-switched or a packet-switched network. In particular, the network 20 may include a circuit-switched network such as a public switched telephone network (PSTN) or a packet-switched network such as a voice over internet protocol (VoIP) network or cellular network (including, but not limited to a GSM (Global System for Mobile Communications), CDMA (Code Division Multiple Access), WCDMA (Wideband CDMA), TDMA (Time Division Multiple Access), UMTS (Universal Mobile Telecommunications System), or LTE (Long-Term Evolution) network). The network 20 may be the same network as network 25 or a different network. The telephone includes a speaker 142 that converts electrical signals into sound, a microphone 144 that converts sound into electrical signals, and an interface 146 that transmits and receives electrical signals over the network 20.

The processing device 120 uses the telephone 140 to join the user to the selected conference call. In one embodiment, the processing device 120 uses the telephone 140 to dial a conference call system telephone number and provide the conference call system with a conference call identification number and/or conference call password. In one embodiment, the processing device 120 may dial the conference call system telephone number and provide the conference call system with the conference call identification number by generating electrical signals representing tones corresponding to the digits of the numbers and transmitting the electrical signals over the network 20 via the interface 146. When prompted or after a predetermined amount of time, the processing device 120 may provide the conference call system with a conference call password or other information. The processing device 120 may indicate that the conference call identification number and or conference call password have been provided by transmitting a tone corresponding to the star key (\*) or pound key (#) on a telephone keypad. Thus, joining the user to the selected conference call may include determining a telephone number and a conference call identification number and providing them via the telephone.

Figure 3:
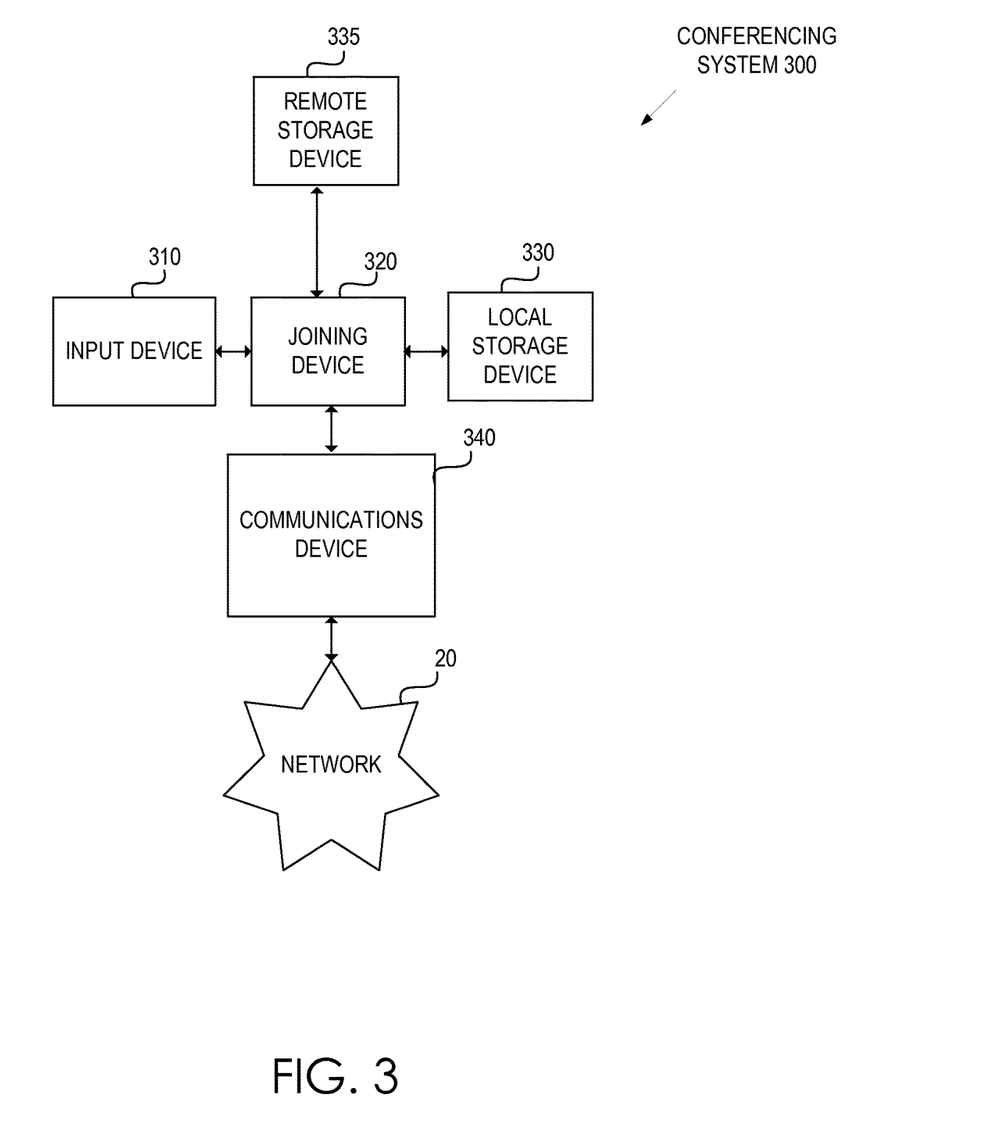
FIG. 3 illustrates a block diagram of one embodiment of a conferencing system.

FIG. 3 illustrates a block diagram of one embodiment of a conferencing system 300. The conferencing system 300 includes an input device 310, a joining device 320, a local storage device 330, a remote storage device 335 and a communications device 340 coupled to a network 20. As above, the network 20 may include a circuit-switched or a packet-switched network. The conferencing system 300 may be embodied, at least in part, as a conference phone, a mobile phone, a mobile computer, a tablet computer, or a desktop computer. The joining device 320 may be a hardware device such as a computing device that is configured to automate certain tasks related to joining conference calls. The joining device may include one or more processors, a memory, inputs and outputs, and so forth. The input device 310, local storage device 330 and communications device 340 may be integrated with the joining device 320 or may be peripheral devices coupled to the joining device 320 via a wired or wireless connection (e.g., a Bluetooth® connection). Additionally, the joining device 320 may be connected to a remote storage device 335, which may be a component of a remote server system. For example, the remote storage device 335 may include a database of calendar information. The joining device 320 may be connected to the remote storage device 335 over a public network, a private network, or a combination thereof.

The conferencing system 300 receives user identification information via the input device 310. The input device 310 may be an RFID reader. An RFID reader may read the user identification information from an RFID chip embedded in a badge of a user. An RFID reader may read the user identification information from an RFID chip in other locations, such as in a cellular telephone of the user or a dermal implant.

The input device 310 may be an NFC communications device. An NFC communications device may read the user identification information from another NFC communications device of the user, such as an NFC communications device embedded in a cellular phone of the user.

The input device 310 may be a barcode scanner. A barcode scanner may read the user identification information from a barcode displayed on a badge of a user. The barcode may be a one-dimensional barcode or a two-dimensional barcode (such as a QR [quick response] code). The barcode scanner may read the user identification information from a barcode displayed in other locations, such as a piece of paper printed out by the user.

The input device 310 may be a keypad. A user may input the user identification information manually. Being relatively static, this information may be easier to remember than conference call information such as a conference call identification number. Similarly, the input device 310 may be a microphone allowing users to identify themselves by saying their name or user identification information. A microphone may allow a user to input user identification information by using another device, such as a cellphone of the user, to produce sounds encoded with the information.

The input device 310 may be a biometric device, such as a fingerprint scanner, voice scanner or retina scanner. In such an embodiment, the input device 310 may receive the biometric data and provide it to joining device 320. The joining device 320 may analyze the biometric data to authenticate a user or may send the biometric data to a remote server system that may perform the authentication, such as by analyzing the biometric data and comparing it to stored biometric data. As an example, where the input device 310 is a voice scanner, the joining device 320 may analyze a received audio waveform to determine the identity of the user by analyzing a word or phrase spoken by the user. The joining device 320 may perform speech recognition of the audio waveform to determine if the word or phrase matches a string in a database or may directly compare the audio waveform to a stored version of audio of the user speaking the word or phrase.

The input device 310 may be an image capture device (e.g., a camera). In such an embodiment, the input device 310 may receive an image or video and perform facial recognition (to determine the identity of the user) and/or gesture recognition (to authenticate the identity of the user in the manner of a password).

The joining device 320 may receive the user identification information. Based on the user identification information, the joining device 320 may retrieve calendar information associated with the user that includes one or more entries specifying one or more scheduled events. The calendar information may be stored in the local storage device 330 or in a remote storage system (e.g., in a database that contains calendar information for a company) that includes the remote storage 335 device. A scheduled event may include, among other things, a telephone call, a chat session, a webinar, or an online meeting. An entry specifying a scheduled event may specify a time of the scheduled event. An entry may specify a connection identifier, such as a phone number or a URL (uniform resource locator). An entry may specify a conference identification number or an event password. An entry may specify other information.

The joining device 320 may retrieve the calendar information associated with the user from the local storage device 330 or from the remote storage device 335. The remote storage device 335 may be remote from other parts of the conferencing system 300. For example, the remote storage device 335 may be a memory in a remote server (like the server system 220 of FIG. 2) or part of a distributed cloud computing system. The joining device 320 may generate and transmit a query to the remote storage device 335 for calendar information associated with the user and receive the calendar information associated with the user in response. Alternatively or additionally, the joining device 320 may search the local storage device 330 for calendar information associated with the user. In one embodiment, the local storage device 330 is first searched. If no calendar entries associated with the user having a scheduled time that differs from a current time by less than a threshold amount are found, then a query is sent to the remote storage device 335.

The joining device 320 may select a scheduled event from the one or more scheduled events specified by the entries of the calendar information associated with the user. The joining device 320 may select an event that is scheduled to begin at a time closest to the present time. The joining device 320 may select an event that is scheduled to begin at a time closest to the present time but that has not yet begun. The joining device 320 may select an event that is scheduled to being at a time closest to the present time but that has not begun more than five, ten, or fifteen minutes ago.

The joining device 320 may select an event based on a priority of the event. For example, an event in which the user is designated as the leader of the event or a speaker at the event may be given a higher priority than other events. The priority of the event may be indicated in the calendar information entry. If a single calendar information entry is retrieved, the joining device 320 may inherently select the scheduled event specified by the single calendar information entry.

The joining device 320 may join the user to the selected scheduled event using a communications device 340 coupled to the network 20. The communications device 340 may include a telephone, a modem, or a network card. The communications device 340 may include an input device or use the input device 310 of the conferencing system 300. The communications device 340 may include an output device or use an output device (not shown) of the conferencing system 300. The communications device 340 may include an interface coupling the communications device 340 (and, thus, the conferencing system 300) to the network 20.

The joining device 320 may join the user to the selected scheduled event by using the communications device 340 to dial a conference call system telephone number and provide the conference call system with a conference call identification number, a conference call password and/or other information. The joining device 320 may join the user to the selected scheduled event by using the communications device 340 to access a URL associated with a webinar or online meeting and provide the server hosting the webinar or online meeting with meeting information.

In on embodiment, a user can connect to the conferencing system 300 via the network 20 and provide the user identification information via the communication device 340. In response, the joining device 320 may retrieve the calendar information associated with the user from the local storage device 330 or from the remote storage device 335 and select a scheduled event from the calendar information. Then, the joining device 320 may connect the user to the appropriate event. For example, the joining device 320 may join the user to a conference call hosted by the conferencing system 300.

Figure 4:
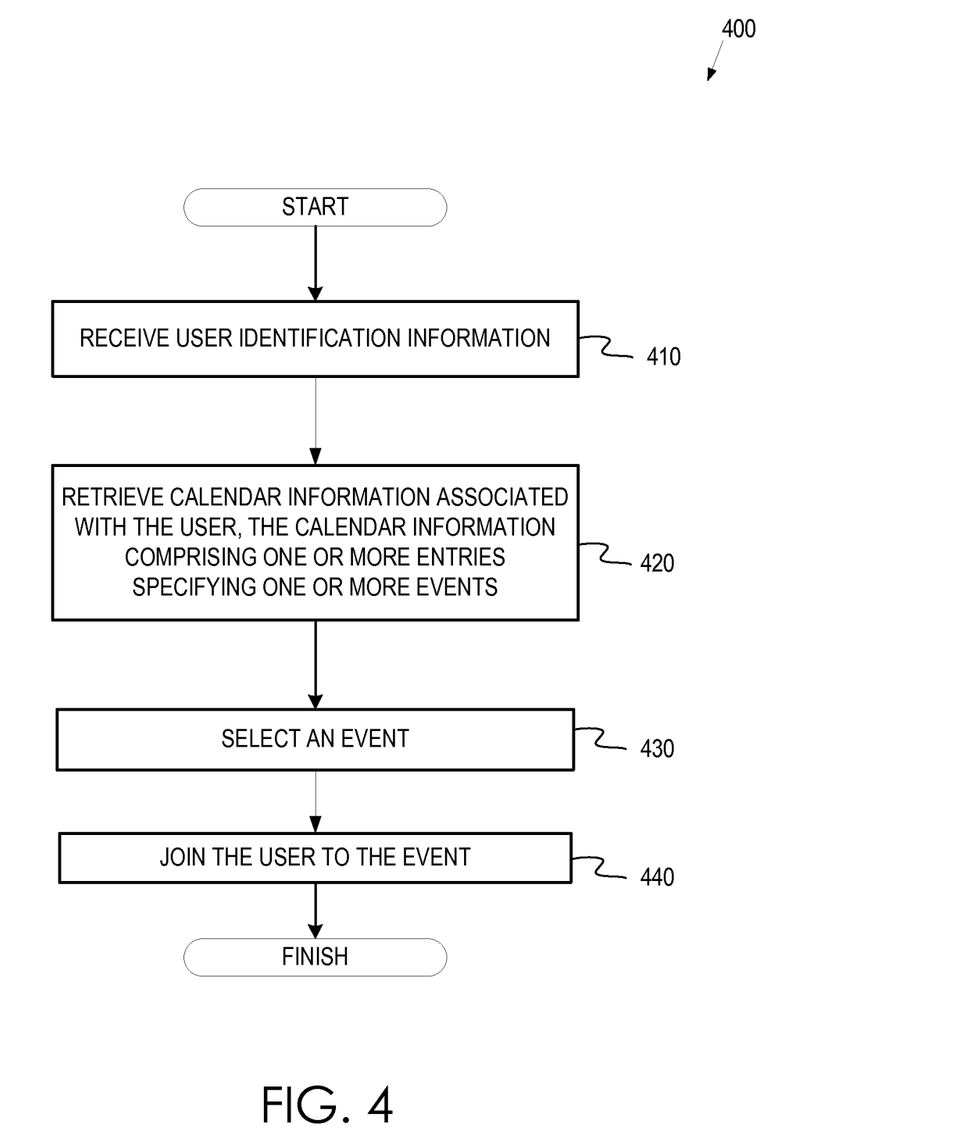
FIG. 4 illustrates a flowchart of an embodiment of a method of joining a user to an event.

FIG. 4 illustrates a flowchart of an embodiment of a method 400 of joining a user to an event. The method 400 may be performed by processing logic that may include hardware (e.g., circuitry, dedicated logic, programmable logic, microcode, etc.), software (e.g., instructions executed by a processing device), firmware or a combination thereof. For example, the method 400 may be performed by the receiving system conferencing system 300 of FIG. 3.

At block 410, the processing logic receives information identifying a user. The information may be received via an input device such as input device 310 of FIG. 3. In one embodiment, receiving the information identifying the user triggers a series of actions that are performed with minimal user input. For example, the steps of block 420 and 430 described below may be performed without user input and in response to receiving the information identifying the user.

At block 420, the processing logic receives calendar information associated with the user. The calendar information may include one or more entries specifying one or more events of the user. As noted above, the calendar information may be received in response to receiving the information identifying the user. For example, when a user presents a badge storing user identifying information, the processing logic may submit a query for the calendar information in response.

At block 430, the processing logic selects one of the events. The processing logic may inherently select the event when the received calendar information only includes information about a single event. As noted above, the processing logic may select the event in response to receiving the information identifying the user (and the calendar information). The processing logic may select the event without user input. In one embodiment, the processing logic identifies a subset comprising two or more events without user input and, from those events, selects a single event based on user input.

At block 440, the processing logic joins the user to the event. The processing logic may join the user to the event with minimal user input. For example, the processing logic may present a prompt asking if the user would like to connect to the event and may connect the user to the event without any user input beyond an affirmative response to that prompt. The processing logic may join the user to the event using a communications device coupled to a network such as the communications device 340 of FIG. 3.

Figure 5:
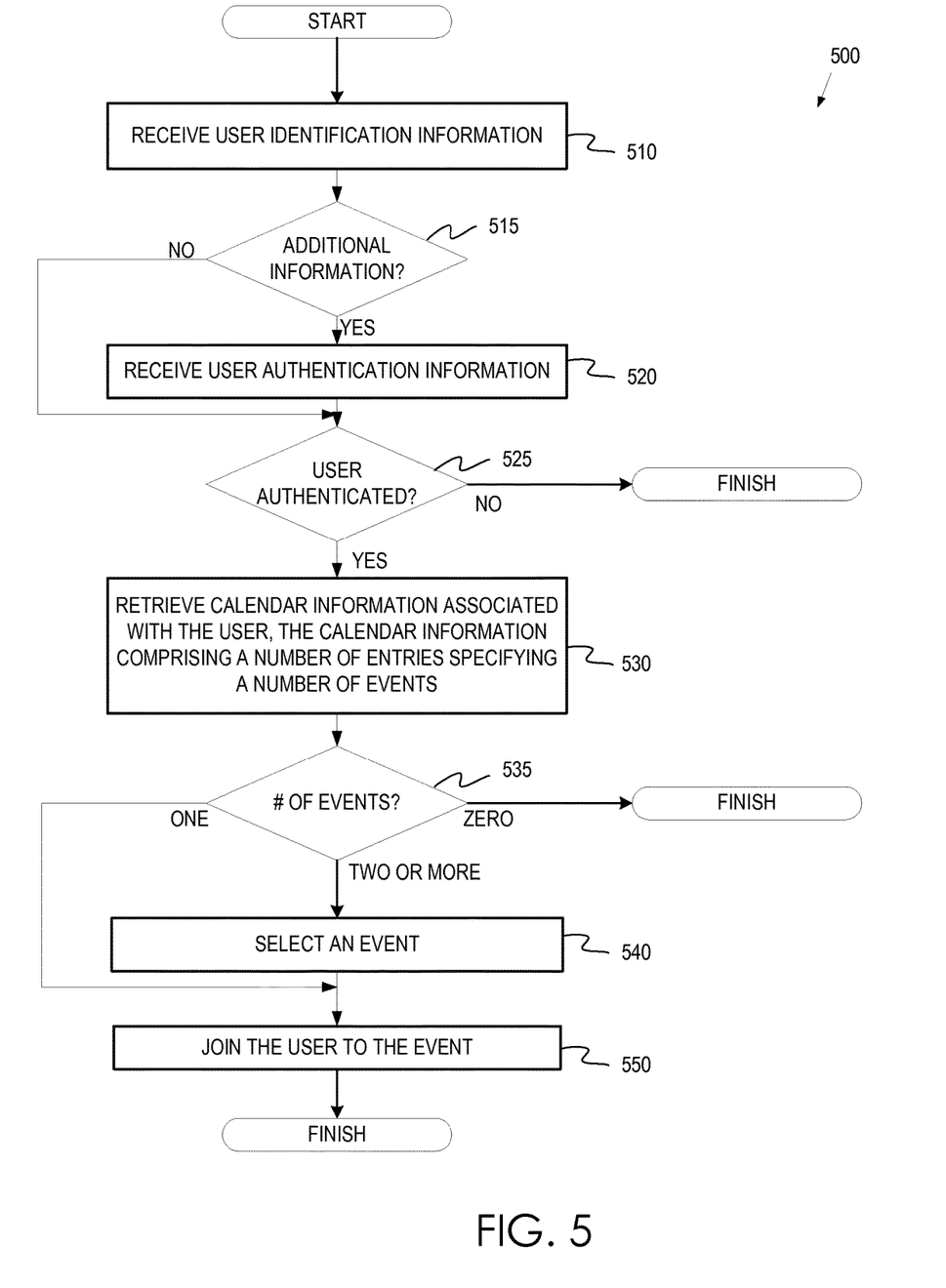
FIG. 5 illustrates a flowchart of another embodiment of a method of joining a user to an event.

FIG. 5 illustrates a flowchart of another embodiment of a method 500 of joining a user to an event. The method 500 may be performed by processing logic that may include hardware (e.g., circuitry, dedicated logic, programmable logic, microcode, etc.), software (e.g., instructions executed by a processing device), firmware or a combination thereof. For example, the method 500 may be performed by the conferencing system 300 of FIG. 3.

At block 510, the processing logic receives user identification information from a user. The information may be received via an input device such as input device 310 of FIG. 3. At block 515, the processing logic determines whether further information should be obtained to authenticate the user. The processing logic may determine whether further information should be obtained from the user based on one or more default rules or based on the user identification information. As an example, the processing logic may determine whether further information should be obtained to authenticate the user based on the type of the user identification information. For example, the processing logic may determine that the user is to be authenticated without further information if the user identification information is received from a fingerprint scanner, but may determine that additional information should be obtained if the user identification information is received via an RFID reader. If the processing logic determines that additional information should be obtained, the method 500 moves to block 520. If the processing logic determines that authentication can be performed using the already received information, the method 500 moves to block 525.

At block 520, the processing device receives user authentication information. The user authentication information may be, for example, a password. The user authentication information may be received via an input device such as the input device 310 of FIG. 3. The user authentication information may be received via a different input device than that of the user identification information. For example, the user identification information may be received (at block 510) via an RFID reader, whereas the user authentication information may be received (at block 520) via a keypad. In one embodiment, the user authentication information is received responsive to prompting the user to provide the user authentication information. The user authentication information may include, for example, a PIN or other information.

At block 525, the processing logic determines whether the user is authenticated based on the received user identification information and/or user authentication information. The processing logic may determine whether the user is authenticated by comparing the received user identification information and/or the received user authentication information with stored user identification information and/or stored user authentication information to determine if they match. If the processing logic determines that the user is authenticated, the method 500 moves to block 530. If the processing logic determines that the user is not authenticated, the method 500 ends. Prior to ending, the method 500 may issue an error message indicating that authentication failed.

At block 530, the processing logic retrieves calendar information associated with the user. The calendar information may include a number of entries specifying a number of events of the user. As described above, the processing logic may retrieve the calendar information by transmitting a query to a server storing calendar information for a number of users and receiving a response containing the calendar information for the particular user.

At block 535, the processing logic determines the number of events specified by the calendar information. If the number of events is zero, the method 500 ends. Prior to ending, the method 500 may issue an error message indicating that no events were found associated with the user. If the number of events is one, the method 500 skips to block 550. If the number of events is two or more, the method 500 moves to block 540.

At block 540, the processing logic selects one of the events. The processing logic may select an event that is scheduled to begin at a time closest to the present time. The processing logic may select an event that is scheduled to begin at a time closest to the present time but that has not yet begun. The processing logic may select an event that is scheduled to being at a time closest to the present time but that has not begun more than five, ten, or fifteen minutes ago.

The processing logic may select an event based on a priority of the event. For example, an event in which the user is designated as the leader of the event or a speaker at the event may be given a higher priority than other events. The priority of the event may be indicated in the calendar information entry. In some embodiments, the event is selected based on a combination of timing and priority.

At block 550, the processing logic joins the user to the event. The processing logic may join the user to the event using a communications device coupled to a network such as the communications device 340 of FIG. 3. The processing logic may join the user to the event by using the communications device to dial a conference call system telephone number and provide the conference call system with a conference call identification number, a conference call password and/or other information. The processing logic may join the user to the event by using the communications device to access a URL associated with a webinar or online meeting and provide the server hosting the webinar or online meeting with meeting information.

Figure 6:
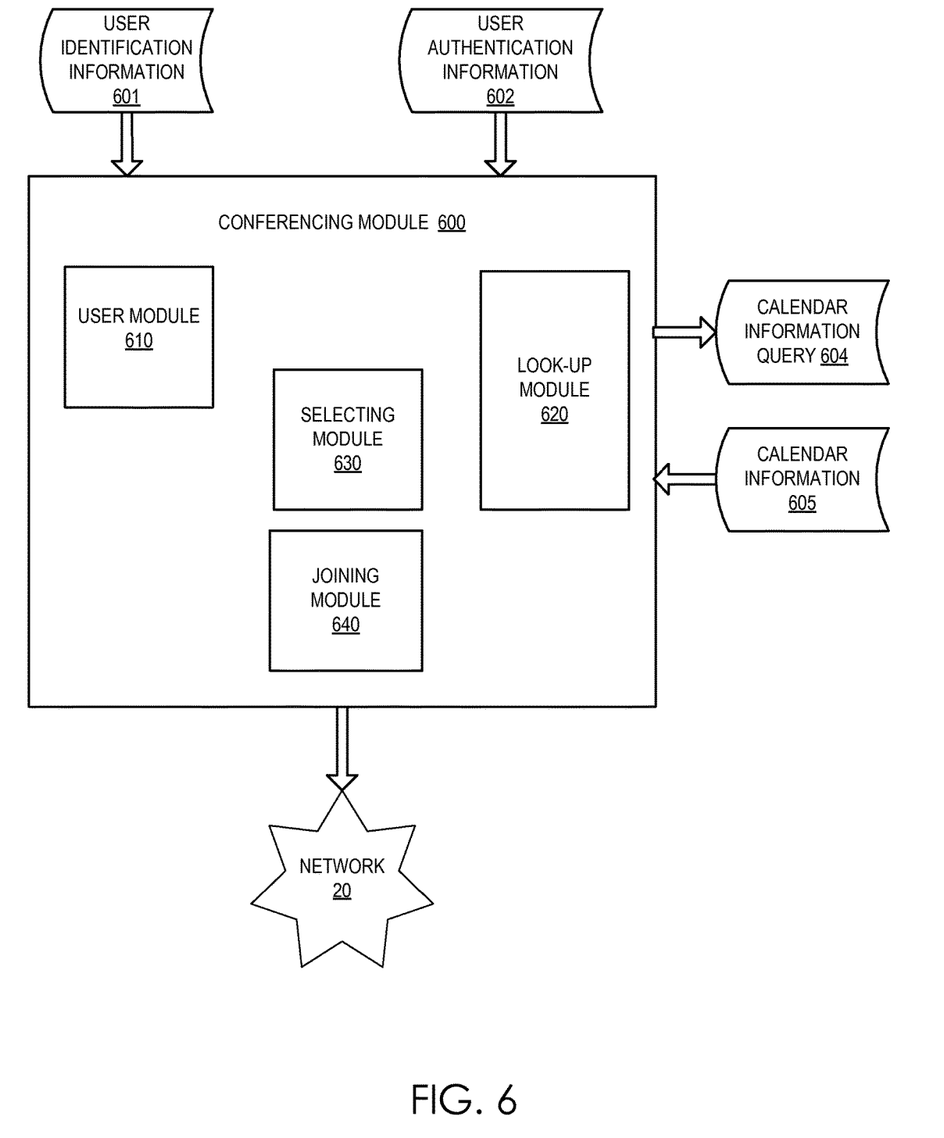
FIG. 6 illustrates an embodiment of a conferencing module

FIG. 6 illustrates an embodiment of a conferencing module 600. The conferencing module 600 may be executed by the joining device 320 of the conferencing system 300 of FIG. 3. Alternatively, the conferencing module 600 may be executed, for example, by the server system 220 or the tabletop device 210 of FIG. 2. The conferencing module 600 takes, as input, user identification information 601 and/or user authentication information 602. The conferencing module 600 may also take calendar information 605. Such calendar information 605 may be stored in a local storage device or may be received as an input in response to a calendar information query 604 produced as an output.

The conferencing module 600 includes a user module 610 that identifies a user based on the received user identification information 601. The user module 610 may also authenticate the user based on the user identification information 601 and the user authentication information 602.

In one embodiment, the conferencing module 600 includes a look-up module 620 that, based on the user identification information 601, generates a calendar information query 604, sends the calendar information query 604 to a remote server system, and processes the returned calendar information 605. Alternatively, look-up module 620 may search a local data store to identify calendar information 605 that matches search parameters (e.g., for a particular time period and/or user).

The conferencing module 600 includes a selecting module 630 that selects an event based on the processed calendar information 605. The selecting module 630 may select an event as described above with respect to block 540 of FIG. 5.

The conferencing module 600 includes a joining module 640 that joins the user to selected event. The joining module 640 may include logic for communicating over a network or for instructing a communications device to communicate over the network. The joining module may join the user to event as described above with respect to block 550 of FIG. 5.

Figure 7:
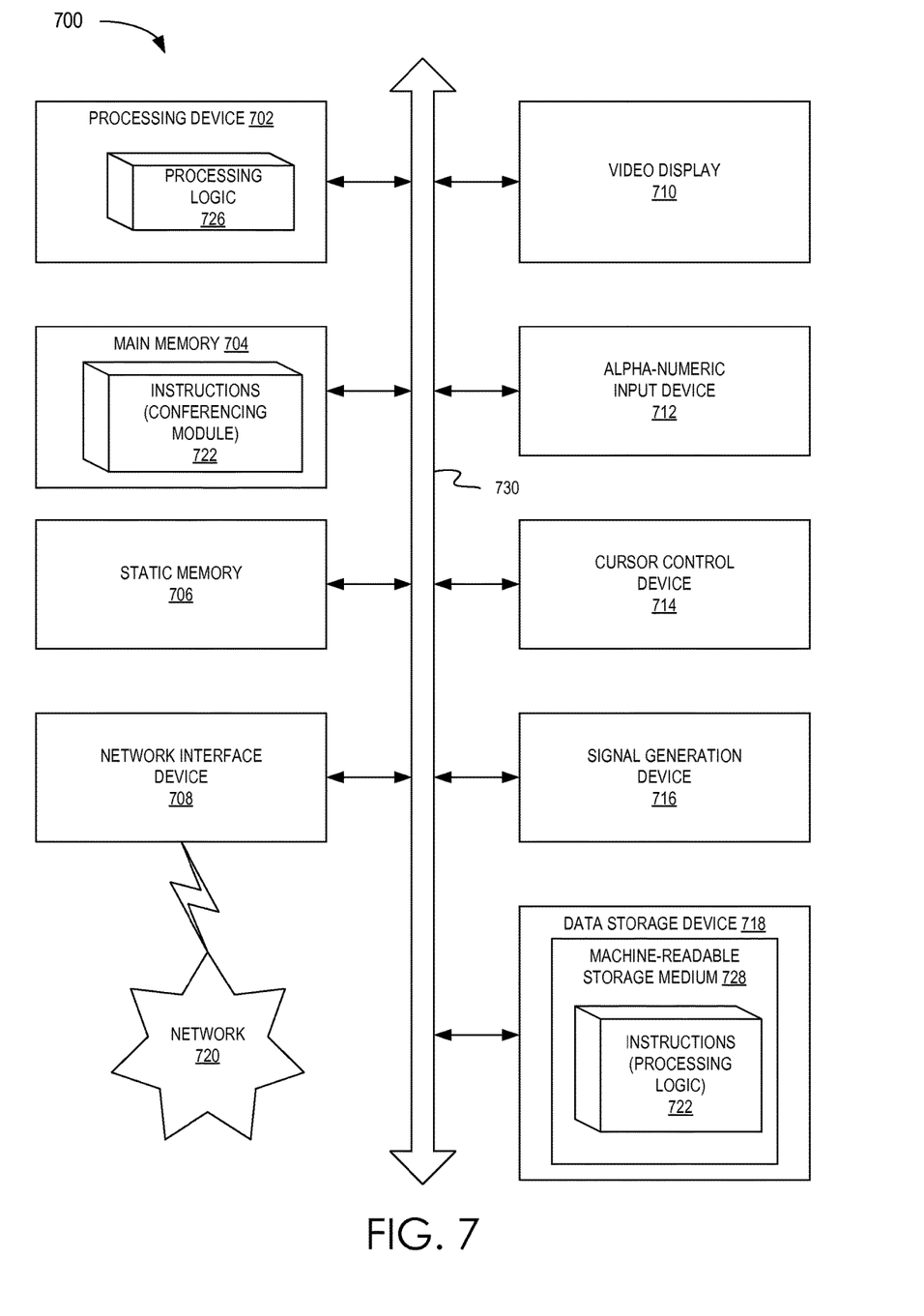
FIG. 7 illustrates a diagrammatic representation of a machine in the exemplary form of a computer system within which a set of instructions for causing the machine to perform any one or more of the methodologies discussed herein may be executed.

FIG. 7 illustrates a diagrammatic representation of a machine in the exemplary form of a computer system 700 within which a set of instructions, for causing the machine to perform any one or more of the methodologies discussed herein, may be executed. The system 700 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may represent the conferencing system 100 of FIG. 1. In one embodiment, computer system 700 may represent the conferencing system 300 of FIG. 3.

The exemplary computer system 700 includes a processing device (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable medium 728 on which is stored one or more sets of instructions 722 (e.g., instructions to perform method 400 of FIG. 4 or method 500 of FIG. 5) embodying any one or more of the methodologies or functions described herein. The instructions 722 may also reside, completely or at least partially, within the main memory 704 and/or within processing logic 726 of the processing device 702 during execution thereof by the computer system 700, the main memory 704 and the processing device 702 also constituting computer-readable media. The instructions may further be transmitted or received over a network 720 via the network interface device 708.

While the computer-readable storage medium 728 is shown in an exemplary embodiment to be a single medium, the term "computer-readable storage medium" or "computer-readable medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "generating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a processing device from a radio frequency identification (RFID) reader associated with a phone, information identifying a user detected by the RFID reader from an RFID chip embedded in an identification badge associated with the user;
   transmitting, by the processing device to a server, a query for calendar information associated with the user based on the information identifying the user received from the RFID reader;
   receiving, by the processing device from the server in response to the query, a calendar information entry associated with a scheduled conference call;
   determining a present time;
   determining a time of the scheduled conference call;
   selecting the scheduled conference call based on the information identifying the user, the present time and the time of the scheduled conference call; and
   starting the scheduled conference call via the phone using the information identifying the user detected by the RFID reader.

2. The method of claim 1, wherein the calendar information entry specifies a time, a phone number, and a conference identification number.

3. The method of claim 1, wherein the selecting comprises identifying a subset of scheduled conference calls without user input and selecting the scheduled conference call of the subset based on user input.

4. The method of claim 1, wherein the selecting is further based on whether the user associated with the information identifying the user is designated a leader of the scheduled conference call.

5. The method of claim 1, further comprising:
determining, without user input, a telephone number and a conference identification number; and
providing the telephone number and conference identification number via the phone.

6. A non-transitory computer-readable medium having instruction encoded thereon which, when executed by a processing device, cause the processing device to perform operations comprising:
receiving, by the processing device from a reader associated with a phone, information identifying a user detected by the reader from the user;
receiving, by the processing device without user input and based on the information identifying the user, calendar information associated with the user, the calendar information comprising an entry associated with a scheduled event;
selecting, by the processing device, the scheduled event based at least in part on the information identifying the user, a present time, and a time of the scheduled event; and
joining, by the processing device, the user to the scheduled event using the information identifying the user.

7. The non-transitory computer-readable medium of claim 6, wherein the reader detects the information identifying the user from the user by at least one of reading a radio frequency identification chip, scanning a barcode, receiving the information via a near-field communication link, receiving biometric data of the user, or receiving an audio encoding of the information.

8. The non-transitory computer-readable medium of claim 6, wherein receiving calendar information associated with the user comprises accessing a user database comprising a plurality of calendar information entries associated with a plurality of users comprising the user.

9. The non-transitory computer-readable medium of claim 6, wherein the entry specifies a time and a telephone number.

10. The non-transitory computer-readable medium of claim 6, wherein the scheduled event comprises a telephone call.

11. The non-transitory computer-readable medium of claim 6, wherein selecting the scheduled event comprises determining a start time for two or more scheduled events and selecting the scheduled event having a start time closest to the present time.

12. The non-transitory computer-readable medium of claim 6, wherein selecting the scheduled event comprises determining a priority for two or more scheduled events and selecting the scheduled event with a higher priority.

13. The non-transitory computer-readable medium of claim 6, wherein joining the user to the scheduled event comprises joining the user to at least one of a telephone call, a chat session, a webinar, or an online meeting.

14. A system comprising:
a reader to receive information identifying a user;
a processing device operatively coupled to the input device, the processing device to, without user input:
retrieve calendar information associated with the user based on the information identifying the user, the calendar information comprising an entry associated with a scheduled event; and
select the scheduled event of the user based at least in part on the information identifying the user, a present time, and a time of the scheduled event; and
a communications device to receive instructions from the processing device to join the user to the scheduled event using the information identifying the user received via the input device.

15. The system of claim 14, wherein the reader comprises at least one of a radio frequency identification (RFID) reader, a barcode scanner, a biometric device, or a microphone.

16. The system of claim 14, wherein the processing device is to retrieve the calendar information associated with the user by transmitting a query to a server for the calendar information.

17. The system of claim 14, wherein the processing device is to host the scheduled event.

18. The system of claim 14, wherein the processing device is to generate instructions to join the user to the scheduled event by generating tones corresponding to a telephone number associated with the scheduled event.

19. The system of claim 14, wherein the processing device is to generate instructions to join the user to the scheduled event by navigating a web browser to a uniform resource locator (URL) associated with the scheduled event.

20. The system of claim 14, wherein the communications device comprises a telephone.

* * * * *